(12) United States Patent
Chatterji et al.

(10) Patent No.: US 6,268,406 B1
(45) Date of Patent: *Jul. 31, 2001

(54) WELL CEMENTING METHODS USING COMPOSITIONS CONTAINING LIQUID POLYMERIC ADDITIVES

(75) Inventors: Jiten Chatterji; Frank Zamora; Bobby J. King; Rita J. McKinley, all of Duncan, OK (US)

(73) Assignee: Halliburton Energy Services, Inc., Duncan, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/478,862

(22) Filed: Jan. 7, 2000

Related U.S. Application Data

(63) Continuation of application No. 09/377,003, filed on Aug. 18, 1999, now abandoned.
(60) Provisional application No. 60/138,397, filed on Jun. 9, 1999.

(51) Int. Cl.[7] ............... C09K 7/00; C08J 3/00; C08K 3/00; C08L 33/24; E21B 33/13
(52) U.S. Cl. ............... 523/130; 166/293; 166/250.14; 524/5
(58) Field of Search ............... 523/130; 524/5; 166/293, 250.14

(56) References Cited

U.S. PATENT DOCUMENTS

| | | | |
|---|---|---|---|
| 4,011,909 | 3/1977 | Adams et al. | 166/293 |
| 4,015,991 | 4/1977 | Persinkski et al. | |
| 4,022,731 | 5/1977 | Schmitt . | |
| 4,515,635 | 5/1985 | Rao et al. | 106/90 |
| 4,555,269 | 11/1985 | Rao et al. . | |
| 5,110,853 * | 5/1992 | Van-Det et al. | 524/375 |
| 5,149,370 | 9/1992 | Olaussen et al. | 106/737 |
| 5,431,783 * | 7/1995 | Honig | 162/164.1 |
| 5,480,921 | 1/1996 | Hunter et al. | 523/331 |
| 5,547,506 | 8/1996 | Rae et al. | 106/730 |

FOREIGN PATENT DOCUMENTS

| | | | |
|---|---|---|---|
| 0 157 055 A2 | 12/1984 | (EP) | C04B/24/16 |
| 0 538 989 A2 | 7/1992 | (EP) | E21B/33/13 |

\* cited by examiner

*Primary Examiner*—Patrick D. Niland
(74) *Attorney, Agent, or Firm*—Craig W. Roddy; C. Clark Dougherty, Jr.

(57) ABSTRACT

Methods of cementing subterranean zones penetrated by a well bores are provided. In accordance with the methods, a cement composition is prepared comprised of a hydraulic cement, sufficient water to form a slurry and an effective amount of a liquid fluid loss control additive comprised of an emulsion having a copolymer of N,N-dimethylacrylamide and 2-acrylamido-2-methylpropane sulfonic acid or a salt thereof contained therein. The cement composition is placed in a subterranean zone and then allowed to set into a hard impermeable mass therein.

28 Claims, No Drawings

WELL CEMENTING METHODS USING COMPOSITIONS CONTAINING LIQUID POLYMERIC ADDITIVES

CROSS REFERENCE TO RELATED APPLICATION

This application is a continuation of application Ser. No. 09/377,003 filed on Aug. 18, 1999, now abandoned, which claims the benefit of U.S. provisional application No. 60/138,397 filed Jun. 9, 1999.

BACKGROUND OF THE INVENTION

1. Field of the Invention

The present invention relates to methods of cementing subterranean zones penetrated by well bores using cement compositions containing liquid polymeric fluid loss additives.

2. Description of the Prior Art

Hydraulic cement compositions are commonly utilized in the construction and repair of oil and gas wells. For example, hydraulic cement compositions are used in primary cementing operations whereby strings of pipe such as casing or liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented. Hydraulic cement compositions are also commonly used to plug lost circulation and other undesirable fluid inflow and outflow zones in wells, to plug cracks and holes in pipe strings cemented therein and to accomplish other required remedial well operations.

In order for such well cementing operations to be successful, the cement compositions utilized must include a fluid loss control additive to reduce the loss of fluid, i.e., water, from the cement compositions when they contact permeable subterranean formations and zones. Excessive fluid loss causes a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore.

Heretofore, polymers and copolymers have been utilized as fluid loss control additives for well cements. Particularly suitable copolymers which have been utilized as cement composition fluid loss additives are described in U.S. Pat. No. 4,515,635 issued to Rao et al. on May 7, 1985 and related U.S. Pat. No. 4,555,269 also issued to Rao et al. on Nov. 26, 1985. The foregoing patents disclose certain copolymers of N,N-dimethylacrylamide (NNDMA) and 2-acrylamido-2-methylpropane sulfonic acid (AMPS®) having mole ratios of NNDMA to AMPS® of between 1:4 and 4:1, respectively, and having average molecular weights of between about 75,000 and 300,000. The copolymers or copolymer salts are produced by solution polymerization techniques whereby aqueous polymer solutions containing 10% by weight of NNDMA/AMPS® copolymers or copolymer salts are obtained. However, because the viscosities of the 10% solutions are very high and the solutions are unpourable, the copolymers or copolymer salts were initially utilized as cement composition fluid loss control additives in dried solid form.

In wells drilled offshore, liquid cement composition additives are preferred so that the additives can be premixed with the cement composition mixing water. In order to utilize the above described solid copolymers and copolymer salts in offshore applications, suspensions of the solid copolymers in oil have been developed and used. That is, solid particles of the copolymers or copolymer salts are suspended in mineral oil containing a suspending agent. However, a problem often encountered in the use of the mineral oil suspensions of the copolymers or copolymer salts is that when they are stored, the solids settle and form an unpourable sludge.

Thus, there are needs for improved liquid fluid loss control additives comprised of NNDMA/AMPS® copolymers or copolymer salts which can be stored for long periods of time without settling and becoming unpourable, and for methods of cementing subterranean zones using cement compositions containing such improved liquid fluid loss control additives.

SUMMARY OF THE INVENTION

The present invention provides liquid fluid loss control additives for cement compositions comprised of NNDMA/AMPS® copolymers or copolymer salts which are storable for long periods of time without becoming unpourable and improved methods of cementing subterranean zones penetrated by well bores utilizing cement compositions containing such liquid fluid loss control additives. Thus, the liquid fluid loss control additives and methods of cementing wells of this invention overcome the deficiencies of the prior art and meet the needs described above.

The methods of the invention are basically comprised of the following steps. A cement composition is first prepared comprised of a hydraulic cement, sufficient water to form a slurry and an effective amount of a liquid fluid loss control additive comprised of an emulsion having a copolymer of NNDMA and AMPS® or a salt thereof contained therein. After being prepared, the cement composition is placed in a subterranean zone to be cemented and allowed to set into a hard impermeable mass therein.

The liquid fluid loss control additives useful in accordance with this invention are water-in-oil emulsions having NNDMA/AMPS® copolymers or copolymer salts dissolved in the water phase of the emulsions. The liquid fluid loss control additives are storable for long periods of time without settling or increasing in viscosity. When combined with hydraulic cement compositions, the emulsion additives invert whereby the NNDMA/AMPS® copolymers or salts thereof are released into the cement compositions. The additives can be prepared using known emulsion copolymerization techniques which will be described further hereinbelow.

In an alternate embodiment, the water in the water-in-oil emulsion can be removed from the emulsion leaving a substantially water free emulsion containing the NNDMA/AMPS® copolymer which can be stored for long periods of time without settling or becoming unpourable.

Thus, it is a general object of the present invention to provide methods of cementing wells using cement compositions containing liquid fluid loss control additives comprised of emulsion NNDMA/AMPS® copolymers or copolymer salts.

Other and further objects, features and advantages of the present invention will be readily apparent to those skilled in the art upon a reading of the description of preferred embodiments which follows.

DESCRIPTION OF PREFERRED EMBODIMENTS

As mentioned above, U.S. Pat. Nos. 4,515,635 and 4,555,269 issued to Rao et al. on May 7, 1985 and Nov. 26, 1985, respectively, disclose cement composition fluid loss control additives comprised of copolymers of N,N-dimethylacrylamide (NNDMA) and 2-acrylamido-2-methylpropane sulfonic acid (AMPS®) or certain salts thereof having NNDMA to AMPS® mole ratios of between 1:4 and 4:1, respectively, and having average molecular weights of between about 75,000 and 300,000. U.S. Pat. Nos. 4,515,635 and 4,555,269 also disclose solution polymerization techniques which can be employed to obtain an aqueous solution of an NNDMA/AMPS® copolymer or copolymer salt containing 10% by weight of copolymer. Also, the patents disclose details concerning the copolymers and copolymer salts, their preparation and their use as fluid loss control additives in cement compositions. The disclosures of U.S. Pat. Nos. 4,515,635 and 4,555,269 are incorporated herein by reference.

The liquid fluid loss control additives useful in accordance with the present invention are basically comprised of a water-in-oil emulsion having a copolymer of NNDMA and AMPS® or a salt of the copolymer dissolved in the water phase of the emulsion. The additives are storable for long periods of time without settling or increasing in viscosity.

The copolymer or copolymer salt contained in an emulsion as described above can be prepared using known emulsion copolymerization techniques. Such a technique is described, for example, in U.S. Pat. No. 4,022,731 issued to Schmitt on May 10, 1997 which discloses the preparation of a self-inverting water-in-oil emulsion containing a synthesized polymer or copolymer. The term "self-inverting emulsion copolymer" when used herein means an NNDMA/AMPS® copolymer or copolymer salt as described above dissolved in the water phase of a water-in-oil emulsion. The disclosure of U.S. Pat. No. 4,022,731 is also incorporated herein by reference.

The known emulsion copolymerization procedure for forming the self-inverting emulsion copolymers referred to above is basically comprised of first forming an aqueous phase by blending and dissolving the NNDMA and AMPS® monomers in deionized water in a mole ratio of NNDMA to AMPS™ in the range of from 1:4 to 4:1, respectively, and more preferably in a mole ratio of 1:1.5, respectively. If desired, the AMPS® monomer can be converted to a salt by adding an alkaline agent capable of producing a salt of at least one member selected from the group consisting of calcium, magnesium and ammonium ions.

After the aqueous phase has been formed, an oil phase comprised of, for example, an alpha olefin having from 14 to 18 carbon atoms, an internal olefin having from 14 to 18 carbon atoms or a paraffin oil having from 10 to 14 carbon atoms, is prepared by dissolving an emulsifying surfactant therein. Examples of emulsifying surfactants that can be used include, but are not limited to, sorbitan mono-oleate substituted with 20 moles of ethylene oxide or an alcohol sulfonate ammonium salt having from 12 to 14 carbon atoms substituted with from 3 to 12 moles of ethylene oxide.

After the oil phase has beep prepared, the water phase is slowly added to the oil phase and the mixture is transferred to a vessel with a high speed stirrer wherein the aqueous phase is homogenized into the oil phase and a water-in-oil emulsion is formed. A polymerization initiator is next added to the emulsion, examples of which include, but are not limited to, tertiary-butyl hydroperoxide, sodium metabisulfite, 2,2'-azobis(2-methylpropionitrile) and 2,2'-azobis(isobutyronitrile). The emulsion polymerization initiator mixture is purged with nitrogen and maintained under copolymerizing conditions for a period of time sufficient to form the desired copolymer.

A more specific, novel and preferred inverse emulsion copolymerization procedure is described in U.S. Provisional Patent Application No. 60/138,333 entitled Inverse Emulsion Polymer and Product Thereof filed on Jun. 9, 1999 by Loeffler et al., and U.S. patent application Ser. No. 09/376,500 of the same title and inventors filed on Aug. 18, 1999, both of which are also incorporated herein by reference.

The salt or salts of the NNDMA/AMPS® copolymer can be produced in accordance with various techniques. For example, the salt may be formed by reaction of an alkaline agent with the AMPS® monomer individually as described above or by reacting the copolymer with the alkaline agent after its copolymerization. As mentioned, the alkaline agent is one capable of producing a salt of at least one member selected from the group consisting of calcium, magnesium and ammonium ions.

As mentioned, the liquid fluid loss control additive useful in accordance with this invention and produced by inverse emulsion copolymerization processes of the types described above are comprised of a water-in-oil emulsion having a copolymer of NNDMA and AMPS® or a salt thereof dissolved in the water phase thereof in an amount in the range of from about 25% to about 75% by weight of the additive. In addition, the additive includes minor amounts of the polymerization initiator or initiators used, a small amount of the emulsifying surfactant used, i.e., an amount in the range of from about 0.5% to about 10% by weight of the additive and small amounts of other components included in the oil phase of the emulsion, the water phase thereof, or both. The emulsion additive is generally comprised of the oil used in an amount of from about 10% to about 50% by weight of the additive, deionized water in an amount in the range of from about 5% to about 50% by weight of the additive and the copolymer or copolymer salt in an amount in the range of from about 25% to about 75% by weight of the additive. The copolymer has a NNDMA to AMPS® mole ratio of from about 1:4 to about 4:1, most preferably 1:1.5, a Brookfield viscosity of less than 20,000 Cps at 25° C. and a polymer reduced viscosity at 0.05 gm/dl active in one normal NaCl at 30° C. of about 3 to about 10 dl/gm and a weight average molecular weight of between about 75,000 to about 300,000 daltons.

A specific preferred water-in-oil emulsion having a 40/60 mole percent copolymer of NNDMA and AMPS®, or a salt of the copolymer, dissolved in the water phase of the emulsion is formed using the following water and oil component compositions:

Aqueous Phase 895.28 parts by weight of 52.7% active AMPS®; 48.9 parts by weight of distilled water; 0.076 parts by weight of methylene bis-acrylamide; 100 parts by weight ammonium chloride; 136.15 parts by weight of NNDMA; 0.25 parts by weight EDTA. (ethylenediaminetetraacetic acid); 1.31 parts by weight of sulfuric acid; and 0.0644 parts by weight of 2-mercaptoethanol.

Oil Phase 271.8 parts by weight of mineral oil; 22.5 parts by weight of alkanolamide; 1.5 parts by weight sorbitan monooleate; and 6 parts by weight of polyoxyethylene (5) sorbitan monooleate.

The preparation and properties of the above described emulsion using the above aqueous and oil phases are given in Example 1 below.

U.S. Pat. No. 5,480,921 entitled Process For Preparation Of Novel High Solids In Non-Aqueous Polymer Compositions issued to Hunter et al. on Jan. 2, 1996 discloses an emulsion copolymerization process similar to those described above except that after the copolymerization reaction is complete, the water in the water-in-oil emulsion is substantially removed leaving a substantially water free emulsion containing the copolymer. Thus, an alternate embodiment of the liquid fluid loss control additive useful in accordance with this invention is comprised of a substantially water free emulsion having the above described copolymer of NNDMA and AMPS® or a salt thereof contained therein in an amount in the range of from about 25% to about 75% by weight of the emulsion and the copolymer. The disclosure of U.S. Pat. No. 5,480,921 is also incorporated herein by reference.

The methods of the present invention for cementing a subterranean zone penetrated by a well bore are basically comprised of the following steps. A cement composition is prepared comprised of a hydraulic cement, sufficient water to form a slurry and an effective amount of a liquid fluid loss control additive as described above comprised of an emulsion having a copolymer of NNDMA and AMPS® or a salt thereof contained therein. Thereafter, the cement composition is placed in a subterranean zone and allowed to set into a hard impermeable mass therein.

The cement compositions useful in accordance with the methods of this invention generally include the emulsion containing the copolymer or copolymer salt in an amount in the range of from about 0.1% to about 5% by weight of cement in the composition.

A variety of hydraulic cements can be utilized in accordance with the present invention including, but not limited to, Portland cements, pozzolana cements, gypsum cements, high aluminum content cements, silica cements and high alkalinity cements. Portland cements are generally preferred with the types defined and described in API Specification For Materials And Testing For Well Cements, API Specification 10, Fifth Edition, dated Jul. 1, 1990 of the American Petroleum Institute being particularly suitable Preferred such API Portland cements include classes A, B, C, G and H, with API Classes G and H being more preferred and Class G being the most preferred.

The water in the cement compositions can be fresh water, unsaturated salt water and saturated salt water including brines and seawater. The water is generally present in a cement composition of this invention in an amount sufficient to form a pumpable slurry, i.e., in an amount in the range of from about 38% to about 50% by weight of cement in the composition.

As will be understood by those skilled in the art, a variety of other well cement composition additives known to those skilled in the art can be included in the cement composition of this invention. Such additives include, but are not limited to, set retarding additives, set accelerating additives, lightweight additives, dispersing agents and the like.

A method of the present invention for cementing a pipe string in a well bore comprises the following steps. A cement composition is prepared comprised of a hydraulic cement, sufficient water to form a pumpable slurry and an effective amount of a liquid fluid loss control additive comprised of an emulsion having a copolymer of NNDMA and AMPS® or a salt thereof contained therein. Thereafter, the cement composition is pumped into the annulus between the pipe string and the walls of the well bore and allowed to set into a hard impermeable mass therein.

The hydraulic cement utilized in the cement composition used for cementing a pipe string in a well bore is preferably Portland cement. When the well being cemented is offshore, the water utilized is usually seawater and the copolymer utilized in the cement composition is preferably a copolymer calcium, magnesium or ammonium salt having a NNDMA to AMPS® mole ratio of 1:1.5.

In order to further illustrate the above mentioned specific preferred water-in-oil emulsion having a 40/60 mole percent copolymer of NNDMA and AMPS®, the following example is given.

EXAMPLE 1

An aqueous phase was prepared containing the following components and amounts:

| Component | Amount |
| --- | --- |
| Distilled water | 48.9 grams |
| 52.7% active AMPS ® | 895.28 grams |
| Methylene bis-acrylamide | 0.076 gram (125 ppm) |
| Ammonium chloride | 100 grams |
| NNDMA | 136.15 grams |
| EDTA | 0.25 gram |
| Sulfuric acid | 1.31 grams |
| 2-Mercaptoethanol | 0.644 gram (106 ppm) |
| | 1182.0304 grams |

An oil phase was prepared containing the following components and amounts:

| Component | Amount |
| --- | --- |
| Mineral Oil | 271.8 grams |
| Fatty acid amid of diethanolamine | 22.5 grams |
| Sorbitan monooleate | 1.5 grams |
| Polyoxyethylene (5) sorbitan monooleate | 6.0 grams |
| | 301.8 grams |

The 1182.0304 grams of the aqueous phase at a pH of 1.75 and the 301.8 grams of the oil phase were added together and then heated to 35° C. over a period of 20 minutes under agitation. After 20 minutes of pre-emulsification and with the temperature at 35° C., nitrogen purging was begun, and an initiator solution comprised of 40 microliters of tertiary-butyl hydroperoxide and 12 grams of 1% sodium metabisulfate solution was added to the emulsion. That is, the tertiarybutyl hydroperoxide was added to the emulsion and the sodium metabisulfite solution was pumped into the agitated emulsion at a rate of 0.1 ml/min. The temperature from polymerization was allowed to reach 38° C. at which point that temperature was maintained with cooling from an ice bath throughout the remainder of the reaction. The sodium metabisulfite feed rate was increased to 1 ml/min over 5 minutes after a 1° C. drop in temperature was observed to ensure completion of the reaction. The total length of the reaction was in the range of from about 60 to 120 minutes.

At the end of the reaction, the sodium metabisulfite solution feed was terminated and the polymerized emulsion was heated to 52° C. over a period of 20 minutes at which point a post-treatment scavenger solution was added. The scavenger solution was comprised of 0.5 gram of 2,2'azobis (2-amidinopropane) hydrochloride and 4 grams of distilled water.

After a post-treatment hold period of 30 minutes, the emulsion was cooled to 45° C. and a nonionic alcohol ethoxylate inverting surfactant was added dropwise over 30 minutes. This addition was followed by a 30 minute hold period. The end emulsion-copolymer product was then cooled to 25° C. and discharged.

The emulsion-copolymer product contained 40% active water soluble copolymer and had a reduced viscosity measured at 0.05 g/dl in 1N NaCl of 4.3 dl/g. The specific properties of the emulsion-copolymer identified as product No. 1 are listed below in Table I.

The above procedure was repeated two more times except that the amount of 2-mercaptoethanol utilized was varied. All other variables remained the same. The specific properties of the resulting emulsion-copolymer products identified as products 2 and 3 are also listed in Table I below.

salt having a NNDMA to AMPS® mole ratio of 1:1.5 and a weight average molecular weight of between about 75,000 to about 300,000 daltons. The test cement compositions included fresh water, salt water containing 5% salt and salt water containing 18% salt. Additional test cement compositions were prepared utilizing the liquid fluid loss control additive of the present invention, i.e., an emulsion having a copolymer salt of NNDMA and AMPS® with the same monomer mole ratio and molecular weight as described above contained therein. These test cement compositions also included fresh water, 5% by weight salt water and 18% by weight salt water. All of the test cement compositions were comprised of Portland Class H cement, water in an amount of 38% by weight of cement and the amount of liquid fluid loss control additive given in Table II below. The liquid fluid loss control additives tested each contained copolymer in an amount of about 2.7% by weight of the emulsion and copolymer in the additives. After mixing, each of the test cement compositions were tested for initial viscosity and viscosity after 20 minutes using an atmospheric consistometer and for fluid loss in accordance with the procedures set forth in the above mentioned API Specification 10. The results of these tests are set forth in Table II below.

TABLE I

| Emulsion-Copolymer Product No. | Quantity of 2-mercaptoethanol used, ppm | Invertability, % | Reduced Viscosity, dl/g | Makedown Viscosity, cp | Fluid Loss at 1000 psig. using 5% salt solution |
|---|---|---|---|---|---|
| 1 | 106 | 40 | 4.2 | 86 | 58 |
| 2 | 100 | 0 | 4.32 | 63 | 36/60 |
| 3 | 125 | 100 | 3.74 | 40 | 84 |

In order to further illustrate the improved cement compositions and methods of this invention, the following examples are given.

EXAMPLE 2

Test cement compositions were prepared utilizing the heretofore used liquid fluid loss control additive comprised of a mineral oil suspension of a particulate solid copolymer

TABLE II

Viscosity And Fluid Loss Tests

Liquid Fluid Loss Additive Used

| Test Cement Composition No. | Water Used | Present Invention, % by wt. of cement | Mineral Oil Suspension of Particulate Solid Copolymer, % by wt. of Cement | Temperature, F. | Viscosity (B$_c$) Initial | Viscosity (B$_c$) After 20 Min. | Fluid Loss cc/30 min. |
|---|---|---|---|---|---|---|---|
| 1 | Fresh | 1.3 | — | 100 | 13 | 11 | 64 |
| 2 | Fresh | 2.6 | — | 100 | 16 | 15 | 20 |
| 3 | Fresh | 3.9 | — | 100 | 31 | 31 | 12 |
| 4 | Fresh | — | 1.1 | 100 | 10 | 14 | 45 |
| 5 | Fresh | — | 2.2 | 100 | 26 | 22 | 10 |
| 6 | Fresh | — | 3.3 | 100 | 26 | 22 | 10 |
| 7 | 5% Salt | 3.9 | — | 120 | 24 | 19 | 36 |
| 8 | 18% Salt | 3.9 | — | 120 | 18 | 15 | 152 |
| 9 | 5% Salt | — | 3.3 | 120 | 22 | 17 | 213 |
| 10 | 18% Salt | — | 3.3 | 120 | 17 | 14 | 34 |

From Table II, it can be seen that the emulsion polymerization fluid loss control additive of this invention produced viscosities and fluid loss values which were the same, within experimental error, to the viscosities and fluid loss values produced by the mineral oil suspension of solid copolymer.

EXAMPLE 3

Two additional cement compositions were prepared, one containing the mineral oil suspension of solid copolymer salt described in Example 1 above and the other containing the emulsion including copolymer salt of the present invention described in Example 1 above. The cement compositions were comprised of Portland Class H cement, fresh water in the amount of 40% by weight of cement, a sodium lignosulfonate set retarding additive in an amount of 0.01% by weight of cement and the liquid fluid loss control additive in an amount of 1.4% by weight of cement. The cement compositions were tested for thickening time at 140° F. and 8,000 psi, zero gel strength and gel strength, all in accordance with the above mentioned API Specification 10. The results of these tests are given in Table III below.

TABLE III

Thickening Time and Static Gel Strength Tests

| Test Cement Composition No. | Liquid Fluid Loss Additive Used | Thickening Time at 140 F. and 8000 psi | Zero Gel, hr:min | Gel Strength, hr:min |
|---|---|---|---|---|
| 1 | Mineral Oil Suspension of Particulate Solid Copolymer | 3:45 | 3:09 | 0:16 |
| 2 | Present Invention | 3:26 | 1:26 | 0:35 |

From Table III, it can be seen that the presence of the liquid fluid loss control additives in the cement compositions did not adversely affect the properties of the cement compositions.

Thus, the present invention is well adapted to carry out the objects and attain the benefits and advantages mentioned as well as those which are inherent therein. While numerous changes to the apparatus and methods can be made by those skilled in the art, such changes are encompassed within the spirit of this invention as defined by the appended claims.

What is claimed is:

1. A method of cementing a subterranean zone penetrated by a well bore comprising the steps of:
   (a) preparing a cement composition comprised of a hydraulic cement, sufficient water to form a slurry and an effective amount of a liquid fluid loss control additive comprised of an emulsion having a copolymer of N,N-dimethylacrylamide and 2-acrylamido-2-methylpropane sulfonic acid or a salt thereof contained therein for controlling fluid loss;
   (b) placing said cement composition in said subterranean zone; and
   (c) allowing said cement composition to set into a hard impermeable mass therein.

2. The method of claim 1 wherein said liquid fluid loss control additive contains said copolymer or copolymer salt in an amount in the range of from about 25% to about 75% by weight of said additive.

3. The method of claim 1 wherein said copolymer or copolymer salt has a N,N-dimethylacrylamide to 2-acrylamido-2-methylpropane sulfonic acid mole ratio of from about 1:4 to about 4:1 and a weight average molecular weight of between about 75,000 and about 300,000 daltons.

4. The method of claim 2 wherein said liquid fluid loss control additive containing said copolymer or copolymer salt is present in said composition in an amount of from about 0.1% to about 5% by weight of cement therein.

5. The method of claim 3 wherein said copolymer or copolymer salt has a N,N-dimethylacrylamide to 2-acrylamido-2-methylpropane sulfonic acid mole ratio of 1:1.5.

6. The method of claim 1 wherein said copolymer salt is formed by reacting the acid monomer forming said copolymer individually or as a copolymer with an alkaline agent capable of producing a salt containing ions of at least one member selected from the group consisting of calcium, magnesium and ammonium ions.

7. The method of claim 1 wherein said emulsion is a water-in-oil emulsion and said copolymer is dissolved in the water phase of said emulsion.

8. The method of claim 7 wherein said water in said water-in-oil emulsion is substantially removed leaving a substantially water free emulsion containing said copolymer.

9. The method of claim 7 wherein said water phase of said emulsion further comprises methylene bis-acrylamide.

10. The method of claim 7 wherein said water phase of said emulsion further comprises 2-mercaptoethanol.

11. The method of claim 1 wherein said hydraulic cement in said composition is selected from the group consisting of Portland cements, pozzolana cements, gypsum cements, high aluminum content cements, silica cements and high alkalinity cements.

12. The method of claim 1 wherein said water in said composition is selected from the group consisting of fresh water, unsaturated salt water and saturated salt water.

13. The method of claim 1 wherein said water is present in said composition in an amount in the range of from about 38% to about 50% by weight of cement therein.

14. A method of cementing a pipe string in a well bore comprising the steps of:
   (a) preparing a cement composition comprised of a hydraulic cement, sufficient water to form a pumpable slurry and an effective amount of a liquid fluid loss control additive comprised of a water-in-oil emulsion having a copolymer of N,N-dimethylacrylamide and 2-acrylamido-methylpropane sulfonic acid or a salt thereof dissolved in the water phase of said emulsion for controlling fluid loss;
   (b) pumping said cement composition into the annulus between said pipe string and the walls of said well bore; and
   (c) allowing said cement composition to set into a hard impermeable mass therein.

15. The method of claim 14 wherein said liquid fluid loss control additive contains said copolymer or copolymer salt in an amount in the range of from about 25% to about 75% by weight of said additive.

16. The method of claim 14 wherein said copolymer or copolymer salt has a N,N-dimethylacrylamide to 2-acrylamido-2-methylpropane sulfonic acid mole ratio of from about 1:4 to about 4:1 and a weight average molecular weight of between about 75,000 and about 300,000 daltons.

17. The method of claim 15 wherein said liquid fluid loss control additive containing said copolymer or copolymer salt is present in said composition in an amount of from about 0.1% to about 5% by weight of cement therein.

18. The method of claim 16 wherein said copolymer or copolymer salt has a N,N-dimethylacrylamide to 2-acrylamido-2-methylpropane sulfonic acid mole ratio of 1:1.5.

19. The method of claim 14 wherein said copolymer salt is formed by reacting the acid monomer forming said copolymer individually or as a copolymer with an alkaline agent capable of producing a salt containing ions of at least one member selected from the group consisting of calcium, magnesium and ammonium ions.

20. The method of claim 14 wherein said water in said water-in-oil emulsion is substantially removed leaving a substantially water free emulsion containing said copolymer.

21. The method of claim 14 wherein said water phase of said emulsion further comprises methylene bis-acrylamide.

22. The method of claim 14 wherein said water phase of said emulsion further comprises 2-mercaptoethanol.

23. The method of claim 14 wherein said hydraulic cement in said composition is selected from the group consisting of Portland cements, pozzolana cements, gypsum cements, high aluminum content cements, silica cements and high alkalinity cements.

24. The method of claim 14 wherein said water in said composition is selected from the group consisting of fresh water, unsaturated salt water and saturated salt water.

25. The method of claim 14 wherein said water is present in said composition in an amount in the range of from about 38% to about 50% by weight of cement therein.

26. The method of claim 14 wherein said copolymer is a calcium salt.

27. The method of claim 14 wherein said copolymer is a magnesium salt.

28. The method of claim 14 wherein said copolymer is an ammonium salt.

* * * * *